United States Patent
Teike et al.

(10) Patent No.: US 10,393,081 B2
(45) Date of Patent: Aug. 27, 2019

(54) HIGH-PRESSURE FUEL PUMP FOR A FUEL SYSTEM FOR AN INTERNAL COMBUSTION ENGINE

(71) Applicant: Robert Bosch GmbH, Stuttgart (DE)

(72) Inventors: Gerd Teike, Ditzingen (DE); Michael Kleindl, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 245 days.

(21) Appl. No.: 15/525,495

(22) PCT Filed: Sep. 10, 2015

(86) PCT No.: PCT/EP2015/070761
§ 371 (c)(1),
(2) Date: May 9, 2017

(87) PCT Pub. No.: WO2016/074826
PCT Pub. Date: May 19, 2016

(65) Prior Publication Data
US 2017/0321646 A1    Nov. 9, 2017

(30) Foreign Application Priority Data
Nov. 10, 2014  (DE) .................. 10 2014 222 873

(51) Int. Cl.
| F02M 63/02 | (2006.01) |
| F02M 63/00 | (2006.01) |
| F02M 59/46 | (2006.01) |
| F16K 17/04 | (2006.01) |

(52) U.S. Cl.
CPC ........ F02M 63/0245 (2013.01); F02M 59/46 (2013.01); F02M 59/464 (2013.01);
(Continued)

(58) Field of Classification Search
CPC ........... F02M 63/0245; F02M 63/0036; F02M 63/005; F02M 63/0054; F02M 63/0077;
(Continued)

(56) References Cited

U.S. PATENT DOCUMENTS 5,715,996 A * 2/1998 Cooper ................. F02M 61/08
137/537
6,382,380 B1 * 5/2002 Shimada ................ F16D 31/02
137/539
(Continued)

FOREIGN PATENT DOCUMENTS

| CN | 102312762 A | 1/2012 |
| CN | 103038555 A | 4/2013 |

(Continued)

OTHER PUBLICATIONS

International Search Report corresponding to PCT Application No. PCT/EP2015/070761, dated Nov. 12, 2015 (German and English language document) (7 pages).

*Primary Examiner* — Mahmoud Gimie
(74) *Attorney, Agent, or Firm* — Maginot, Moore & Beck LLP

(57) ABSTRACT

A high-pressure fuel pump for a fuel delivery system of an internal combustion engine includes a pressure limiting valve positioned between an outlet and an inlet of the pump. The valve includes a spring-loaded closing element and a closing body that radially holds the closing element in place, and that has a concave receiving portion configured to at least partially receive the closing element. The receiving portion has a radially outer first area with a first opening angle, and a radially inner second area with a second opening angle larger than the first opening angle. The first area and the second area are located outside of a contact region between the closing element and the closing body.

10 Claims, 3 Drawing Sheets

(52) U.S. Cl.
CPC ...... *F02M 63/005* (2013.01); *F02M 63/0036* (2013.01); *F02M 63/0054* (2013.01); *F02M 63/0077* (2013.01); *F02M 63/0078* (2013.01); *F16K 17/0406* (2013.01); *F16K 17/0433* (2013.01); *F16K 17/042* (2013.01)

(58) Field of Classification Search
CPC .. F02M 63/0078; F02M 59/46; F02M 59/464; F16K 17/0406; F16K 17/0433; F16K 17/042
USPC ............... 123/332, 506; 137/14, 528, 511; 91/420; 251/337
See application file for complete search history.

(56) References Cited

U.S. PATENT DOCUMENTS

| | | | |
|---|---|---|---|
| 7,780,144 | B2 * | 8/2010 | Van Der Linden ................... F02M 59/462 137/539 |
| 2005/0016599 | A1 * | 1/2005 | Talaski ................. F16K 15/044 137/539 |
| 2007/0068580 | A1 * | 3/2007 | Van Der Linden ................... F02M 59/462 137/539 |
| 2008/0240952 | A1 * | 10/2008 | Rodriguez-Amaya ................ F02M 59/464 417/499 |
| 2011/0284092 | A1 | 11/2011 | Spencer et al. |
| 2011/0315005 | A1 | 12/2011 | Oikawa et al. |
| 2011/0315909 | A1 * | 12/2011 | Oikawa ................ F02M 55/025 251/337 |
| 2015/0078922 | A1 * | 3/2015 | Oikawa ................ F04B 1/0452 417/213 |

FOREIGN PATENT DOCUMENTS

| | | | |
|---|---|---|---|
| DE | 297 13 295 U1 | 11/1997 | |
| GB | 176037 A | 2/1922 | |
| JP | 2002-276492 A | 9/2002 | |
| JP | 2003-185041 A | 7/2003 | |
| WO | WO-2012095272 A1 * | 7/2012 | ........... F02M 59/464 |

* cited by examiner

HIGH-PRESSURE FUEL PUMP FOR A FUEL SYSTEM FOR AN INTERNAL COMBUSTION ENGINE

This application is a 35 U.S.C. § 371 National Stage Application of PCT/EP2015/070761, filed on Sep. 10, 2015, which claims the benefit of priority to Serial No. DE 10 2014 222 873.5, filed on Nov. 10, 2014 in Germany, the disclosures of which are incorporated herein by reference in their entirety.

The disclosure relates to a high-pressure fuel pump in accordance, and to a pressure limiting valve.

BACKGROUND

High-pressure fuel pumps for fuel systems of internal combustion engines, for example for direct gasoline injection, are known from the marketplace. A high-pressure fuel pump can convey fuel from a low-pressure region, for example downstream of a prefeed pump, into a high-pressure region, for example into a high-pressure accumulator (rail). To this end, high-pressure fuel pumps frequently have a pressure limiting valve which can limit a fuel pressure in the high-pressure region to a predefinable maximum value. Therefore, operation of the high-pressure fuel pump can be improved and possible damage of the fuel system can be prevented.

SUMMARY

The problem on which the disclosure is based is solved by way of a high-pressure fuel pump, and by way of a pressure limiting valve. Advantageous developments are specified in the following description, the claims, and in the drawings, it being possible for the features to be important for the disclosure both on their own and in different combinations, without reference being made explicitly again hereto.

The disclosure relates to a high-pressure fuel pump for a fuel system for an internal combustion engine, having a pressure limiting valve which is arranged hydraulically between an outlet and a region which is upstream of the outlet, which pressure limiting valve has a spring-loaded closing element which is secured radially by a closing body, the closing body having a concave receiving section, in which the closing element is received in regions. According to the disclosure, an opening angle of a radially outer first region of the receiving section of the closing body is smaller than an opening angle of a radially inner second region of the receiving section of the closing body, both regions being arranged radially outside a contact region between the closing element and the closing body.

By way of the configuration according to the disclosure of the receiving section with the use of a plurality of radial regions of different configuration, an increase in the force by means of a deflection of the fuel flow is made possible on the closing element and/or on the closing body. A calculation of the forces which act on the described elements is possible, for example, by means of a corresponding impulse equation. The disclosure makes improved incident flow of the closing body ("spring support") possible, as a result of which more homogeneous opening and lower loading of a valve spring which loads the closing body in the closing direction can arise. Furthermore, a damaging influence on production tolerances, in particular of the closing body, can be reduced. Furthermore, possible axial vibrations of the closing element during an opening operation and/or a closing operation of the pressure limiting valve can be reduced.

Here, a number of impacts between the closing element on one side and a valve seat of the pressure limiting valve on the other side can be reduced. As a result, loading of the valve spring and stress of the closing element and the valve seat can be reduced. Moreover, a comparatively high mass flow which flows through the open pressure limiting valve and therefore a comparatively rapid dissipation of a positive pressure at the outlet of the high-pressure fuel pump are made possible. Therefore, the function of the high-pressure fuel pump overall can also be improved.

In one refinement of the high-pressure fuel pump, at least one of the two regions comprises a planar annular face; in particular, at least one of the two regions is formed by an annular face of this type. As a result, the hydraulic properties of the closing body can be improved and its production can be simplified, as a result of which costs can be lowered.

It can be provided, furthermore, that both regions comprise a planar annular face, the opening angle of the annular face of the radially inner second region being from approximately 100 degrees to approximately 150 degrees, and the opening angle of the annular face of the radially outer first region being from approximately 70 degrees to approximately 130 degrees. As a result, particularly advantageous dimensioning of the closing body and/or the receiving section is described.

It can be provided, furthermore, that the (overall concave) receiving section has a third region which lies radially inward from the radially inner second region, comprises a planar annular face or is configured as an annular face of this type, has an opening angle of from approximately 70 degrees to approximately 110 degrees, preferably approximately 90 degrees, and against which the closing element bears. Therefore, the third region comprises the contact region which is described further above, or is even identical to said contact region. The closing element can be guided and/or held in a particularly satisfactory manner by way of the dimensioning according to the disclosure of the third region, as a result of which the function of the pressure limiting valve is improved.

In a further refinement of the high-pressure fuel pump, the closing element is configured as a ball or at least in sections as a cone. Both geometries of the closing element are suitable in a particularly satisfactory manner for interaction with the closing body which is configured according to the disclosure.

It can be provided, furthermore, that an axial extent of the radially outer first region is from approximately 0.1 mm to approximately 0.4 mm. Here, in one preferred refinement, the radially outer first region is configured so as to directly adjoin an annular end face of the closing body, which end face faces the closing element.

Furthermore, the disclosure comprises a pressure limiting valve for a high-pressure fuel pump, which pressure limiting valve is configured in accordance with one or more of the refinements which are described further above. The advantages which have already been described result here.

BRIEF DESCRIPTION OF THE DRAWINGS

In the following text, exemplary embodiments of the disclosure will be described with reference to the drawing, in which:

FIG. 3 shows an enlarged illustration of an approximately central section of the pressure limiting valve from FIG. 2 with respective end sections of a valve body and a closing body and with a closing element which is arranged in between.

DETAILED DESCRIPTION

The same designations are used for functionally equivalent elements and variables in all figures, even in the case of different embodiments.

Figure 1:
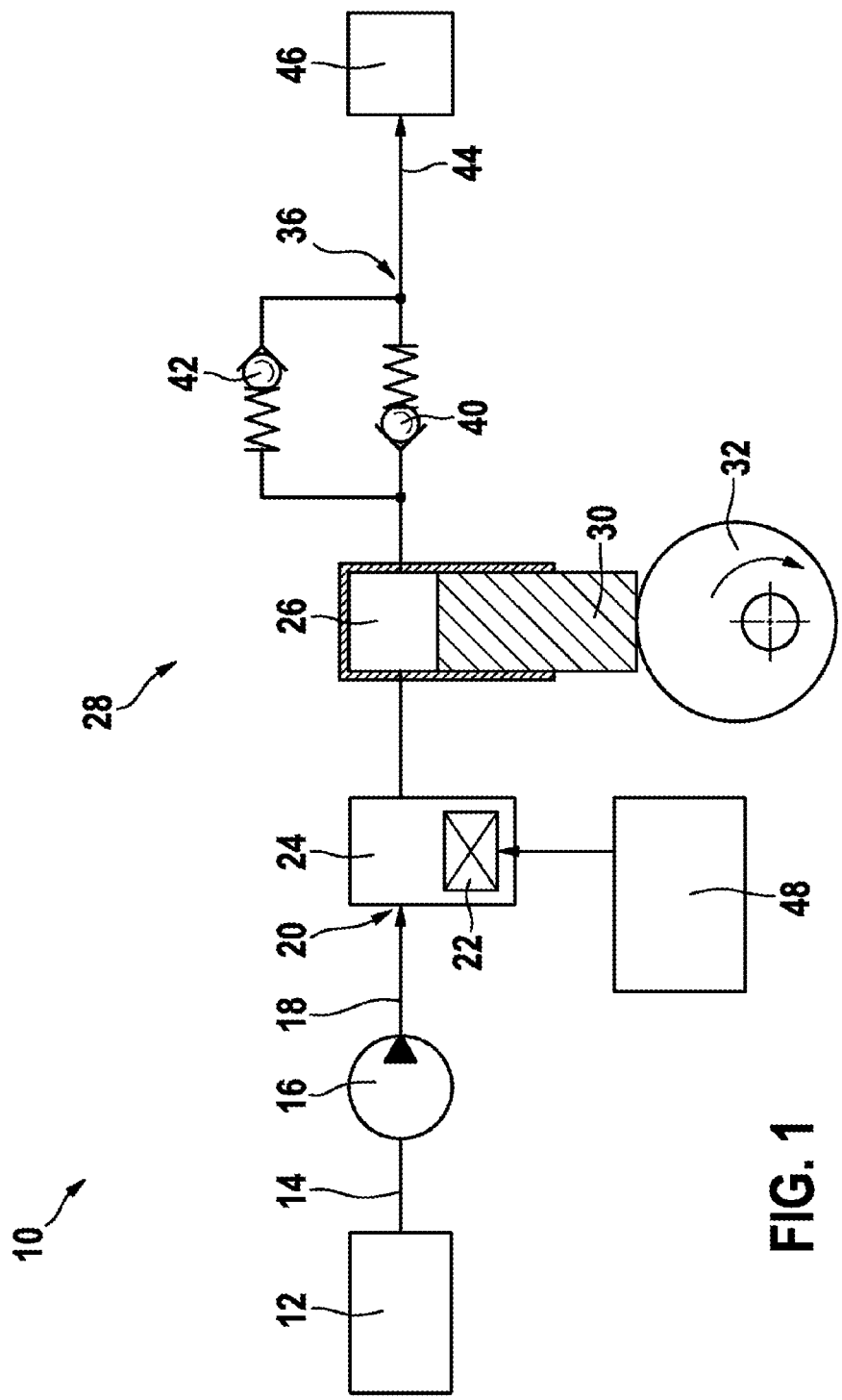
FIG. 1 shows a diagrammatic illustration of a fuel system for an internal combustion engine.

FIG. 1 shows a fuel system 10 for an internal combustion engine (not shown in further detail) in a simplified diagrammatic illustration. Fuel is fed from a fuel tank 12 via a suction line 14, by means of a prefeed pump 16, via a low-pressure line 18, via an inlet 20 of a quantity control valve 24 which can be actuated by an electromagnetic actuating device 22, to a conveying space 26 of a high-pressure fuel pump 28. For example, the quantity control valve 24 can be an inlet valve of the high-pressure fuel pump 28, which inlet valve can be opened by force.

In the present case, the high-pressure fuel pump 28 is configured as a piston pump, it being possible for a piston 30 to be moved vertically in the drawing by means of a cam plate 32. An outlet valve 40 which is illustrated in FIG. 1 as a spring-loaded check valve and a pressure limiting valve 42 which is likewise illustrated as a spring-loaded check valve are arranged hydraulically between the conveying space 26 and an outlet 36 of the high-pressure fuel pump 28. The outlet 36 is connected to a high-pressure line 44 and, via the latter, to a high-pressure accumulator 46 ("common rail").

The outlet valve 40 can open toward the outlet 36 and the pressure limiting valve 42 can open toward the conveying space 26. The electromagnetic actuating device 22 is actuated by way of a control and/or regulating device 48. In a deviation from the illustration of FIG. 1, a left-hand connector (in FIG. 1) of the pressure limiting valve 42 can, as an alternative, also be connected to the conveying space 26 or any desired other element upstream of the high-pressure fuel pump 28 instead of to the outlet (without designation) of the high-pressure fuel pump 28.

During operation of the fuel system 10, the prefeed pump 16 conveys fuel from the fuel tank 12 into the low-pressure line 18. The quantity control valve 24 can be closed and opened in a manner which is dependent on a respective requirement for fuel. As a result, the fuel quantity which is conveyed to the high-pressure accumulator 46 is influenced. In the normal case, the pressure limiting valve 42 is closed.

Figure 2:
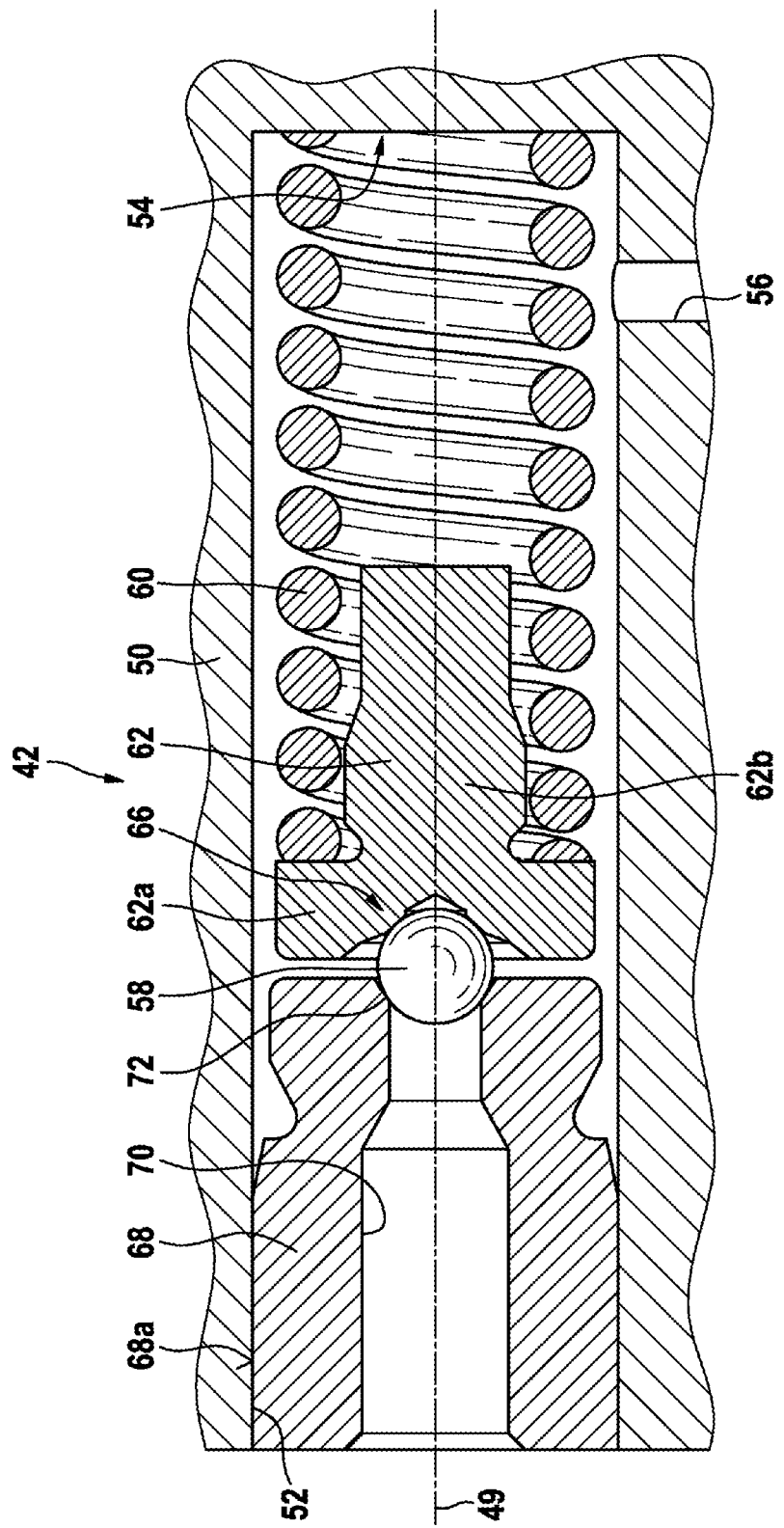
FIG. 2 shows a longitudinal section through a pressure limiting valve of a high-pressure fuel pump of the fuel system from FIG. 1.

If, in an operating case which differs from the normal case, a fuel pressure in the high-pressure line 44 is higher than a fuel pressure in a region of the conveying space 26 (plus a spring force of a valve spring 60 of the pressure limiting valve 42, see also FIG. 2), the pressure limiting valve 42 can open and therefore fuel can flow out of the high-pressure line 44 back into the conveying space 26 and, from there, possibly back into the low-pressure line 18. As a result of the expansion, the fuel pressure in the high-pressure line 44 can drop to a reliable value and the pressure limiting valve 42 can close again.

FIG. 2 shows a longitudinal section through the pressure limiting valve 42 of the high-pressure fuel pump 28 from FIG. 1. The pressure limiting valve 42 is arranged hydraulically between the outlet 36 and a region of the high-pressure fuel pump 28, which region is upstream from the outlet 36, and can open toward the upstream region. The pressure limiting valve 42 or its elements which are described in greater detail in the following text is/are configured so as to be substantially rotationally symmetrical about a longitudinal axis 49.

The pressure limiting valve 42 comprises a housing 50 which is configured substantially as a cylindrical sleeve. On a left-hand end side in FIG. 2, the housing 50 has an axial first opening 52, a radius of the opening 52 corresponding to an inner radius of the cylindrical sleeve. The first opening 52 is assigned hydraulically to the outlet 36 and/or to the high-pressure region which is downstream of the latter. On a right-hand end wall 54 in FIG. 2, the housing 50 is of closed configuration. In a right-hand lower section, the housing 50 has a radial second opening 56. The second opening 56 is assigned hydraulically to said region of the high-pressure fuel pump 28, which region is upstream with regard to the outlet valve 40, and is connected to the conveying space 26, for example. In the present case, the housing 50 is of single-piece configuration.

In a horizontally central section in FIG. 2, the pressure limiting valve 42 has a closing element 58 which is loaded in the closing direction, that is to say to the left in FIG. 2, by means of a closing body 62 by a valve spring 60 which is configured as a helical spring. The closing element 58 is secured radially by the closing body 62. In the present case, the closing element 58 is a "freely floating" valve ball. In a right-hand section of the valve spring 60 in FIG. 2, said valve spring 60 is supported axially on the end wall 54 of the housing 50. The valve spring 60 is guided radially by means of the housing 50 and by means of the closing body 62. A left-hand end section 62a of the closing body 62 in FIG. 2 is of approximately disk-shaped configuration, an external diameter of the end section 62a being greater than an internal diameter of the valve spring 60.

Furthermore, the closing body 62 comprises a pin-shaped guide section 62b which is arranged on the right-hand side in FIG. 2 and is arranged radially within the valve spring 60. Here, the guide section 62b has a first diameter in an approximately central axial section of the closing body 62 and a second diameter in a right-hand axial section in FIG. 2, which second diameter is smaller than the first diameter. Both diameters are in each case smaller than an internal diameter of the valve spring 60. As a result, the closing body 62 can be held axially and radially in the valve spring 60 in a defined manner.

In the present case, the closing body 62 has a concave receiving section 66 on the disk-shaped end section 62a on its left-hand end side in FIG. 2, in which receiving section 66 the closing element 58 is received in regions. In the following FIG. 3, the receiving section 66 will still be described in detail. By means of the closing body 62 or the concave receiving section 66, a compressive force which is generated by way of the valve spring 60 can be transferred in an optimum manner to the closing element 58 (valve ball).

In the present case, the closing body 62 is of solid configuration and is produced, for example, from a plastic material. In one embodiment (not shown) of the pressure limiting valve 42, the closing body 62 has one or more cavities at least in sections, as a result of which weight can be saved.

A valve body 68 is arranged in a left-hand section of the housing 50 in FIG. 2, which valve body 68 is held in a frictionally locking manner in the housing 50 on its radially outer circumferential face 68a and is preferably pressed into said housing 50. The valve body 68 has a continuous axial centric longitudinal channel 70 which has a constant internal diameter in sections. The longitudinal channel 70 is connected hydraulically to the outlet 36 (on the left-hand side in FIG. 2). A radially circumferential valve seat 72 is configured on the valve body 68 at a right-hand end section of the longitudinal channel 70 in FIG. 2, which valve seat 72 interacts with the closing element 58 when the pressure limiting valve 42 is closed. The geometries of the valve body 68 and the closing body 62 are preferably dimensioned in such a way that the closing element 58 (valve ball) can be held in a defined manner and/or can be moved in a defined manner ("floating path").

In a further embodiment (not shown) of the high-pressure fuel pump 28, the housing 50 of the pressure limiting valve 42 is an integral constituent part of the high-pressure fuel pump 28 and is therefore not an independent element. To this end, the high-pressure fuel pump 28 has, for example, a cylindrical bore, in which the functional elements of the pressure limiting valve 42 are received.

Figure 3:
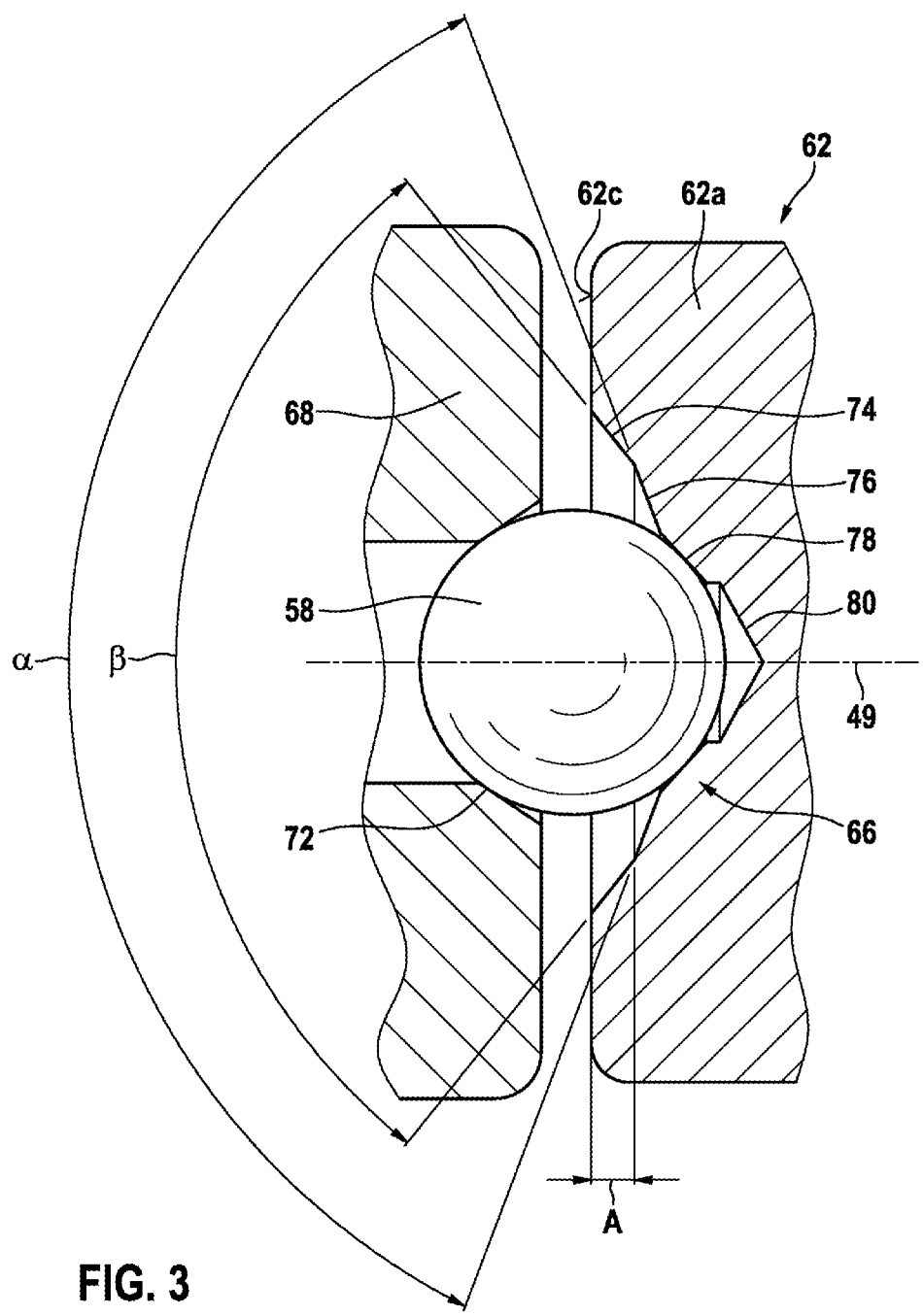

FIG. 3 shows an axially approximately central section of the pressure limiting valve 42 from FIG. 2. An end section of the valve body 68 is shown together with the end section 62a of the closing body 62 and the closing element 58 which is arranged axially between the valve body 68 and the closing body 62.

In the present case, the (overall) concave receiving section 66 of the closing body 62 has four regions which are arranged in a rotationally symmetrical manner about the longitudinal axis 49. The following are present on the receiving section 66 from radially on the outside toward radially on the inside: a radially outer first region 74, a radially inner second region 76, a contact region 78 between the closing element 58 and the closing body 62, and an approximately conical centric recess 80.

In the present case, the radially outer first region 74 is configured so as to be directly adjacent with respect to an annular end face 62c of the closing body 62, which end face 62c faces the closing element 58. An axial extent A of the radially outer first region 74 is preferably from approximately 0.1 mm (millimeter) to approximately 0.4 mm.

In particular, an opening angle β of the radially outer first region 74 is smaller than an opening angle α of the radially inner second region 76. Both regions 74 and 76 are arranged radially outside the contact region 78. The conical centric recess 80 is configured in such a way that the closing element 58 cannot bear against a circumferential wall face (without designation) of the centric recess 80, but rather is always spaced apart therefrom.

In the present case, the radially outer first region 74 and the radially inner second region 76 in each case comprise a planar conical annular face or are formed by a planar conical annular face. In the present case, the opening angle α of the annular face of the radially inner second region 76 is approximately 140 degrees, and the opening angle β of the annular face of the radially outer first region 74 is approximately 95 degrees. In embodiments (not shown) of the pressure limiting valve 42, the opening angle α of the annular face of the radially inner second region 76 is from approximately 100 degrees to approximately 150 degrees, and the opening angle β of the annular face of the radially outer first region 74 is from approximately 70 degrees to approximately 130 degrees, the opening angle β always being smaller than the opening angle α.

In a further embodiment (not shown) of the pressure limiting valve 42, merely one of the two regions 74 or 76 comprises a planar annular face.

The contact region 78 which was described further above and against which the closing element 58 bears, in particular when the pressure limiting valve 42 is closed, corresponds to a third region of the receiving section 66. Said third region therefore lies radially inward from the radially inner second region 76. In the present case, the third region likewise comprises a substantially planar annular face or is configured as an annular face of this type. The third region can have an opening angle (without designation) of from approximately 70 degrees to approximately 110 degrees. In the embodiment according to FIG. 3, said opening angle is approximately 90 degrees.

In the embodiment of the pressure limiting valve 42 according to FIGS. 2 and 3, the closing element 58 is configured as a ball ("valve ball"). In one embodiment (not shown), the closing element 58 is configured at least in sections as a cone.

The invention claimed is:

1. A high-pressure fuel pump for a fuel system of an internal combustion engine, comprising:
    a pressure limiting valve positioned hydraulically between an outlet and a region which is upstream of the outlet, and including:
        a spring-loaded closing element; and
        a closing body configured to radially secure the closing element, and having a concave receiving section configured to at least partially receive the closing element, the receiving section having:
            a radially outer first region with a first opening angle; and
            a radially inner second region with a second opening angle that is larger than the first opening angle, the radially inner second region being located radially inside the radially outer first region;
            wherein the first region and second region are located radially outside a contact region between the closing element and the closing body.

2. The high-pressure fuel pump as claimed in claim 1, wherein at least one of the first region and the second region defines an annular conical face.

3. The high-pressure fuel pump as claimed in claim 2, wherein:
    the first region and the second region each define a respective annular conical face,
    the first opening angle is in a range from approximately 100 degrees to approximately 150 degrees, and
    the second opening angle is in a range from approximately 70 degrees to approximately 130 degrees.

4. The high-pressure fuel pump as claimed in claim 1, wherein:
    the receiving section further has a third region which lies radially inward from the radially inner second region, which defines an annular conical face, and which has an opening angle in a range from approximately 70 degrees to approximately 110 degrees, and
    the closing element bears against the annular conical face.

5. The high-pressure fuel pump as claimed in claim 1, wherein the closing element is configured as a ball or at least in sections as a cone.

6. The high-pressure fuel pump as claimed in claim 1, wherein an axial extent of the radially outer first region is in a range from approximately 0.1 mm to approximately 0.4 mm.

7. The high-pressure fuel pump as claimed in claim 1, wherein the radially outer first region directly adjoins an annular end face of the closing body that faces toward the closing element.

8. The high-pressure fuel pump as claimed in claim 1, wherein closing body is interposed between the closing element and a spring that spring-loads the closing element.

9. The high-pressure fuel pump as claimed in claim 1, wherein the pressure limiting valve further comprises a valve seat against which the closing element is configured to seal in a closed position, the valve seat located on an opposite side of the closing element from the receiving section.

10. A pressure limiting valve for a high-pressure fuel pump, comprising:
- a spring-loaded closing element; and
- a closing body configured to radially secure the closing element, and having a concave receiving section configured to at least partially receive the closing element, the receiving section having:
  - a radially outer first region with a first opening angle; and
  - a radially inner second region with a second opening angle that is larger than the first opening angle, the radially inner second region being located radially inside the radially outer first region;
- wherein the first region and second region are located radially outside a contact region between the closing element and the closing body.

\* \* \* \* \*